United States Patent [19]

Ohsawa

[11] Patent Number: 4,636,709
[45] Date of Patent: Jan. 13, 1987

[54] REGULATED DC POWER SUPPLY

[75] Inventor: Mitsuo Ohsawa, Kanagawa, Japan

[73] Assignee: Sony Corporation, Tokyo, Japan

[21] Appl. No.: 634,290

[22] Filed: Jul. 25, 1984

[30] Foreign Application Priority Data

Jul. 29, 1983 [JP] Japan .............................. 58-139044
Jul. 30, 1983 [JP] Japan .............................. 58-140403

[51] Int. Cl.⁴ .............................................. G05F 1/20
[52] U.S. Cl. .................................................. 323/267
[58] Field of Search ................ 323/267, 268, 273, 274

[56] References Cited

U.S. PATENT DOCUMENTS 3,705,342 12/1972 Dalke .................................. 323/273
3,790,878 2/1974 Brokaw .............................. 323/267
4,449,173 5/1984 Nishino et al. ..................... 323/267

OTHER PUBLICATIONS

Thomas Durgavich, "Compact DC-DC Converter Yields +15 V from +5 V", ELECTRONICS, 6/12/1975, vol. 48, No. 12, p. 103.

Primary Examiner—Clifford C. Shaw
Attorney, Agent, or Firm—Lewis H. Eslinger; Alvin Sinderbrand

[57] ABSTRACT

A power supply circuit for supplying stabilized positive and negative DC voltages of opposite polarity but equal magnitude requires only a single voltage source that supplies a first DC voltage, and a polarity converting circuit connected to the voltage source provides a second DC voltage equal in magnitude but opposite in polarity to the first DC voltage. First and second voltage stabilizing circuits are connected to the voltage source and the polarity converting circuit, respectively, to provide between respective output terminals and a common ground line the equal level but opposite polarity voltages. Voltage stabilization is provided in the stabilizing circuits by the use of Zener diode circuits to provide biasing to control the collector-emitter paths of respective transistors, and polarity conversion is accomplished by a switching transistor controlled by a pulse-width modulation signal generator having its input derived from a level comparison circuit.

18 Claims, 2 Drawing Figures

REGULATED DC POWER SUPPLY

BACKGROUND OF THE INVENTION

1. Field of the Invention

The present invention relates generally to a circuit for supplying positive and negative voltages and, more particularly, to a power supply circuit to supply positive and negative power-source voltages derived from a single positive or negative voltage source.

2. Description of the Prior Art

In audio equipment, such as systems for reproducing stereophonic sound signals recorded on records, discs, or tapes, positive and negative power source voltages are often used with the intention of increasing the dynamic range of the audio output signals, for suppressing noise in the audio output channels, and for reducing the absolute values of the power source voltages in the system. These positive and negative power source voltages are generally required to have substantially the same absolute values and, therefore, the power source employed in the audio apparatus using positive and negative power source voltages must be capable of producing and supplying positive and negative voltages having the same values.

There has been proposed a power supply circuit that supplies positive and negative power-source voltages derived from two batteries, or sets of series-connected batteries, having a positive terminal grounded and a negative terminal grounded, respectively. In such power supply circuit as previously proposed, however, there are inherent problems and disadvantages involved, for example, multiple batteries are required and this involves a relatively large space requirement in the apparatus and also increases the weight of the entire system.

There has also been proposed a power supply circuit that uses a single DC voltage source to provide the required positive and negative voltages of the same value and employs a DC-DC convertor, operating with a DC voltage supplied from a single DC voltage source. Such power supply circuit also has disadvantages in that the DC-DC convertor must be constructed using: a transformer, a switching circuit connected to the primary of the transformer, a control circuit to control the operation of the switching circuit, and two detecting circuits connected to the secondary of the transformer, in order to produce the positive and negative DC voltages of the same absolute value. Thus, it is seen that the configuration of the entire power supply circuit becomes complicated and must be constructed on a relatively large scale. Additionally, further problems are involved because it is difficult to increase the efficiency in converting positive and negative DC voltages supplied from a single DC voltage source, and also it is easy to overload the switching device in the switching circuit portion of this known power supply circuit.

OBJECTS AND SUMMARY OF THE INVENTION

Accordingly, it is an object of the present invention to provide a power supply circuit for supplying positive and negative power source voltages of substantially equal level that avoids the above-mentioned problems and disadvantages inherent in the prior art.

Another object of this invention is to provide a power supply circuit that can supply stabilized positive and negative power source voltages having substantially the same absolute value, which has a relative simple configuration, and which uses a unitary DC voltage source.

A further object of this invention is to provide a power supply circuit that can supply stabilized positive and negative power source voltages having a relative simple configuration and requiring only a single DC voltage source, and which can prevent the stabilized positive and negative power source voltages from being adversely affected by sudden variations occurring in the DC voltage from the single DC voltage source.

A still further object of the present invention is to provide a power supply circuit that can supply stabilized positive and negative power source voltages using only a single DC voltage source, whereby a power source unit can be miniaturized in both size and weight.

In accordance with an aspect of the present invention, there is provided a power supply circuit comprising a single voltage source providing a DC voltage and a first stabilizer circuit connected between the voltage source and a power-source, voltage-supply output terminal, a polarity converting circuit connected to the single voltage source for producing at another output terminal a second DC voltage having substantially the same absolute value as that of the first DC voltage but with opposite polarity, and a second stabilizing circuit connected between the output of the polarity converting circuit and the other output terminal, so that positive and negative power source voltages of the same absolute level are provided using only a single voltage source.

One embodiment of the present invention further comprises a choke coil having one end connected between the single voltage source and the input of the first voltage stabilizer circuit and a capacitor connected across the series circuit of the choke and voltage source.

By constructing the power supply circuit according to the present invention, and in the case where the voltage source comprises a unitary battery, the number of batteries used can be reduced so that the power-source unit can be miniaturized and, further, the use of a DC-DC convertor is not necessary.

Because the positive and negative power-source voltages having substantially the same absolute value are obtained using only a single voltage source, and because these power-source voltages are stabilized against variations in the DC voltage supplied from the single voltage source by operation of the first and second stabilizer circuits, the power supply circuit according to the present invention is particularly suitable for employment in audio apparatus utilized in automobiles, in which the automobile battery is the single voltage source. The power supply circuit according to the present invention is also suitable for use in forming a power source of an operational amplifier that needs positive and negative power source voltages which are highly symmetrical.

The above and other objects, features, and advantages of the present invention will become apparent from the detailed description of an illustrative embodiment taken in conjunction with the accompanying drawings.

DESCRIPTION OF THE PREFERRED EMBODIMENT

Figure 1:
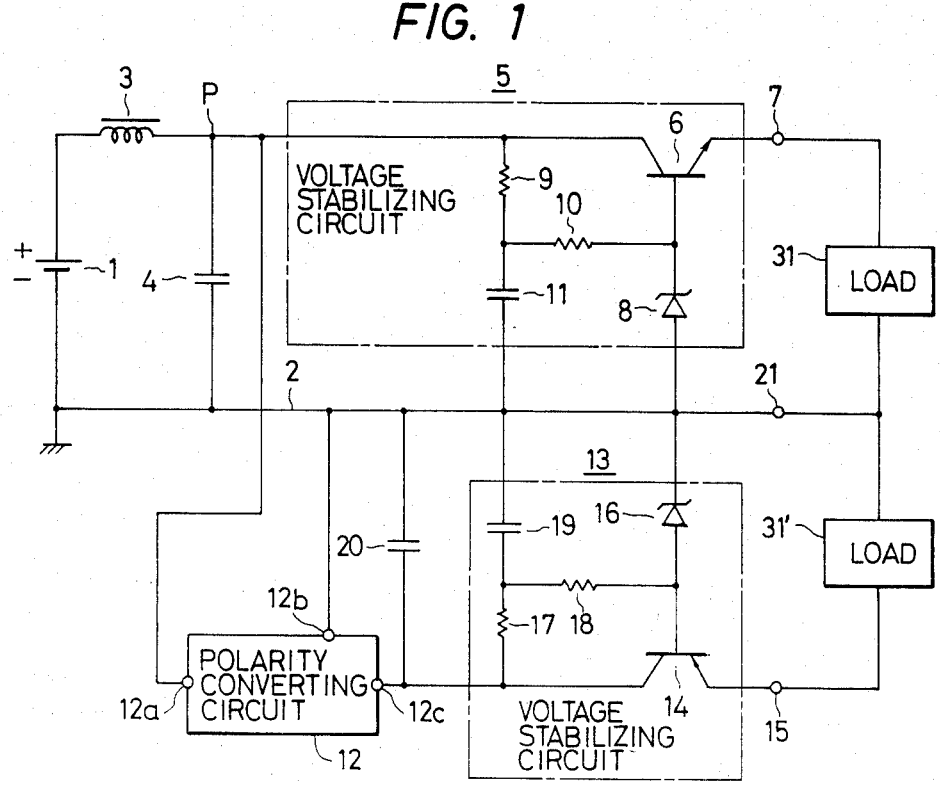
FIG. 1 is a circuit diagram of an embodiment of a power supply circuit according to the present invention having suitable loads connected thereto.

An embodiment of the power supply circuit according to the present invention having a pair of loads connected thereto is shown in FIG. 1, in which a single battery, such as the conventional twelve-volt, lead-acid cell typically provided in an automobile, is used as the DC voltage source. Battery 1 has its negative terminal connected to an earth or common line 2 at relative ground potential, that is, battery 1 is connected in a negative-ground circuit. Choke coil 3 and capacitor 4 are connected in series between the positive and negative terminals of battery 1 to aid in absorbing or suppressing level variations occurring suddenly in the positive voltage output of battery 1. Between the connecting point P of choke coil 3 and capacitor 4 and power-source voltage supply output terminal 7 is connected the collector-emitter path of NPN transistor 6, which forms part of voltage stabilizer circuit 5. In addition to NPN transistor 6 having its collector lead connected to connection point P and its emitter lead connected to power-source, voltage-supply, output terminal 7, voltage stabilizer circuit 5 includes Zener diode 8 connected between the base lead of NPN transistor 6 and the earth or ground line 2, and a diode biasing circuit consisting of resistors 9 and 10 and capacitor 11 for supplying predetermined current to Zener diode 8 to cause it to produce a constant voltage. The constant voltage thus produced by Zener diode 8 is applied to the base circuit of NPN transistor 6, so that the voltage at the emitter lead of NPN transistor 6 is thereby stabilized.

Also connected to connecting point P between choke coil 3 and capacitor 4 is an input terminal 12a of polarity converting circuit 12. This circuit 12 produces a negative voltage relative to ground potential that has substantially the same absolute value as that of a positive voltage present at connection point P. A common input terminal 12b of the polarity converting circuit 12 is connected to earth or ground line 2, and the output terminal 12c is connected through the collector-emitter path of PNP transistor 14 to power-source, voltage-supply, output terminal 15. Thus, polarity converting circuit 12 acts to convert the positive voltage relative to ground fed in at input 12a to a negative voltage relative to ground of the same magnitude fed out at output terminal 12c. A second voltage stabilizer circuit 13 is formed by PNP transistor 14 having its collector lead connected to output terminal 12c of polarity converting circuit 12 and its emitter lead connected to power source voltage-supply, output terminal 15 and includes the same components as stabilizer 5. More specifically, Zener diode 16 is connected between the base lead of PNP transistor 14 and the earth or ground line 2, note that the polarity of the diode is reversed from that of stabilizer 5, and a diode biasing circuit including resistors 17 and 18 and capacitor 19 supplies a predetermined current to Zener diode 16 to cause the diode to produce a constant voltage at its anode. The constant voltage provided at the anode of Zener diode 16 is applied to the base circuit of PNP transistor 14, whereby the voltage obtained at the emitter lead thereof is stabilized.

Further, capacitor 20 having a large capacitance value, relative to capacitors 9 and 19, is connected between the collector lead of PNP transistor 14 and the common or earth line 2 to absorb sudden variations arising in the negative voltage supplied from output terminal 12c of polarity converting circuit 12.

The two output voltages from the power supply circuit of FIG. 1 are available across three output terminals, specifically, common terminal 21 is connected in the earth or ground line 2, and the positive voltage from the positive terminal of battery 1 is available through the voltage stabilizer circuit 5 across power-source, voltage-supply, output terminal 7 and common terminal 21. Similarly, the negative voltage obtained from the output terminal 12c of polarity converting circuit 12, having the same absolute value as the positive voltage from battery 1, is obtained through the voltage stabilizer circuit 13 across common terminal 21 and power-source, voltage-supply output terminal 15.

In the circuit of FIG. 1, when the positive voltage supplied from battery 1 suddenly varies in level, or when there is an apparent voltage level variation caused by external noise pulses that combine with the positive voltage from the battery, such level variations are absorbed by a combination of the choke coil 3 and capacitor 4, so that the level variations are effectively eliminated from the positive voltage present at connecting point P. Even if the positive voltage at connecting point P does vary in level, this voltage is subjected to further stabilization by voltage stabilizer circuit 5, so as to produce the stabilized power source voltage between positive output terminal 7 and common terminal 21. Similarly, if the negative voltage produced at the output terminal 12c of polarity converting circuit 12 varies in level, voltage sources are stabilized by capacitor 20 and this negative voltage is further stabilized by voltage stabilizing circuit 13, so that the required stabilized negative power source voltage is present across common terminal 21 and negative power-source, voltage-supply, output terminal 15.

Figure 2:
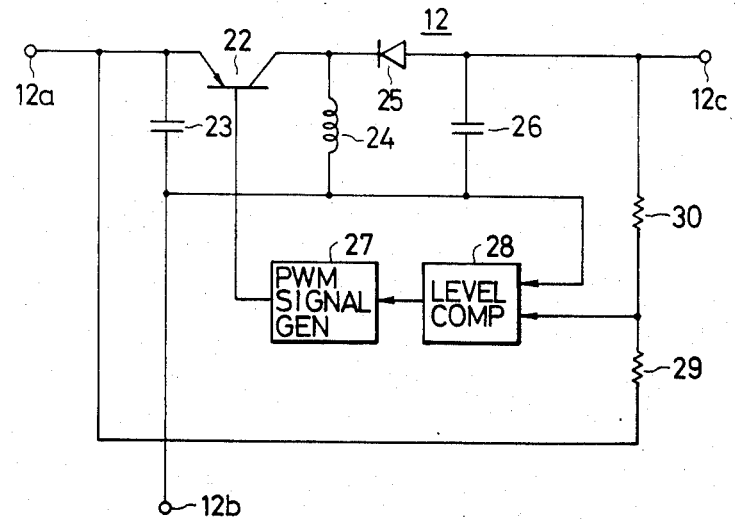
FIG. 2 is a circuit diagram of one embodiment of a polarity converting circuit used in the embodiment of FIG. 1.

Polarity converting circuit 12 of FIG. 1 is shown in more detail in FIG. 2, in which input terminal 12a is connected to the emitter lead of switching transistor 22 and capacitor 23 aids in absorbing level variations in the positive voltage supplied to the emitter lead and is connected between the emitter lead of switching transistor 22 and the common or center lead terminal 12b. Coil 24 operates as an energy charging device and is connected between the collector lead of switching transistor 22 and common input terminal 12b, which is connected to the ground or common line 2. A detector circuit is formed of diode 25 and capacitor 26 and is connected between the collector lead of switching transistor 22 and the common line at terminal 12b, with the connection point between the anode of diode 25 and one end of capacitor 26, that is, the output of the detecting circuit portion, being connected to output terminal 12c of the polarity converting circuit 12. The output of a pulse-width modulation signal generator 27 is connected to drive the base circuit of switching transistor 22, and the control terminal (input) of pulse-width modulation signal generator 27 is connected to the output terminal of level comparison circuit 28. A reference input terminal of level comparison circuit 28 is connected to the common line at terminal 12b and the comparison input terminal of level comparison circuit 28 is connected through resistor 29 to input terminal 12a and through resistor 30 to output terminal 12c. Resistors 29 and 30 form a voltage divider and are selected to have the same resistance values.

Polarity converting circuit 12 of FIG. 2 is utilized in a situation where the positive voltage provided at connection point P is supplied to input terminal 12a and common terminal 12b is connected to the earth or common line 2, which is to be connected to ground. In such a condition a pulse width modulated output signal from pulse-width modulation signal generator 27 is fed to drive the base circuit of switching transistor 22 to cause it to switch in response thereto. When switching transistor 22 is conductive, a current flows from the connecting point P through the emitter-collector path of switching transistor 22 and through coil 24 to common terminal 12b, and when switching transistor 22 is nonconductive such current is prevented from flowing. As a result, positive and negative pulses arise across coil 24 and are detected by diode 25 to produce a negative voltage at the anode thereof. This negative voltage at the anode of diode 25 is smoothed by capacitor 26 and, thus, a smooth negative voltage is obtained at output terminal 12c. This negative voltage at output terminal 12c and the positive voltage supplied at input terminal 12a from connecting point P are supplied to the comparing input terminal of level comparison circuit 29 through resistors 30 and 29, respectively. That is, the negative voltage obtained at output terminal 12c and the positive voltage at connecting point P are combined at the comparing input terminal of level comparison circuit 28, in which the combined voltage supplied thereto is compared with the voltage at the reference input terminal 12b, that is, a zero voltage level, to produce a resultant output voltage corresponding to the difference therebetween. This resultant output is supplied to the control terminal of pulse-width modulation signal generator 27, and the duty cycle of the pulse width modulated signal fed to the base lead of switching transistor 22 is controlled by the output of level comparison circuit 28, so that the ratio of the time period in which switching transistor 22 is conductive to the time period in which switching transistor 22 is nonconductive is controlled. The result of such control is that the level of the negative voltage obtained at output terminal 12c is correspondingly controlled. In such control, the normal point for control is based upon the condition in which the combined voltaged fed to the comparing input terminal of level comparison circuit 28 coincides with the voltage at the reference input terminal of level comparison circuit 28 and, therefore, control is obtained in such a manner that the combined voltage fed to the comparing terminal of level comparison circuit 28 is zero. That is, the absolute value of the negative voltage obtained at output terminal 12c coincides exactly with the absolute value of the positive voltage supplied at input terminal 12a from connecting point P and, thus, a negative voltage of the same absolute value as the positive voltage is accurately produced at output terminal 12c.

In the manner described above, the power supply circuit according to the present invention accurately supplies positive and negative power-source voltages at power-source, voltage-supply, output terminals 7 and 21 and 15 and 21 having the same absolute value from a single power source. Accordingly, in the case where a pair of equal loads 31 and 31' are connected between positive, power-source, voltage-supply, output terminal 7 and common terminal 21 and between negative, power-source voltage-supply, output terminal 15 and common terminal 21, respectively, as shown in FIG. 1, which would be the case where the inventive power supply circuit is utilized to form a power source unit in a high-fidelity stereo audio system, a pair of currents of the same value will flow in opposite directions through the earth or common line 2. This means that substantially no total current will flow through the earth or common line 2. Accordingly, although the earth line 2 has a certain inherent resistance no voltage drop is caused by such resistance and, consequently, no noise arises from earth line 2.

Although the embodiment shown in FIG. 1 is provided with a single battery 1 supplying the positive voltage as the DC voltage source, it is understood that a battery supplying a negative voltage could be employed in its place. In such negative battery embodiment, the voltage stabilizer circuits 5 and 13 would be interchanged, and polarity converting circuit 12 would be arranged to produce a positive voltage having the same absolute value as that of the negative voltage that would be obtained at connecting point P. The modified power supply circuit would then be operative to supply negative and positive power source voltages from the power-source, voltage-supply, output terminals 7 and 15, respectively.

Additionally, it should be understood that choke coil 3 can be omitted from the embodiment of FIG. 1. Also, in the case where such voltage stabilizing circuits as shown with reference numeral 5 and 13 in FIG. 1 are used, there is the further advantage that the output impedance at the power-source, voltage-supply output terminal is reduced.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A power supply for supplying DC voltages of opposite polarity, comprising:
    a DC voltage source having a first terminal at which a first DC voltage is provided and a second terminal connected to a common line;
    first voltage stabilizing means connected between said first terminal of said voltage source and a first power-source, voltage-supply output terminal for stabilizing said first DC voltage at said first output terminal;
    polarity converting means connected to said first teriminal of said voltage source and to said common line and including a switching means controlled by a pulse-width modulation signal generator for supplying at an output terminal a second DC voltage of substantially the same absolute value and of opposite polarity as said first DC voltage; and
    second voltage stabilizing means connected between said output terminal of said polarity converting means and a second power-source, voltage-supply output terminal for stabilizing said second DC voltage at said second output terminal, whereby positive and negative DC voltages of substantially equal absolute value and of opposite polarity are respectively provided between said first and second power-source, voltage-supply output terminals and said common line.

2. A power-supply according to claim 1, in which said first voltage stabilizing means comprises a transistor of a first junction polarity having a collector-emitter path connected between said first terminal of said voltage source and said first power-source, voltage-supply, output terminal, a first Zener diode connected at one end to said common line and at the other end to a base lead of said first transistor, and first biasing circuit means for supplying a predetermined constant current through said first Zener diode, and in which said second voltage stabilizing means comprises a second transistor of a second junction polarity, opposite that of said first junction polarity, and having a collector-emitter path connected between said output of said polarity converting means and said second power-source, voltage-supply, output terminal, a second Zener diode connected at one end to said common line and at the other end to a base lead of said second transistor, and second biasing circuit means for supplying a predetermined constant current through said second Zener diode.

3. A power supply according to claim 2, in which said first biasing circuit means includes a voltage-divider, resistor network connected to said common line, to said first terminal of said voltage source, and to said base lead of said first transistor, and in which said second biasing circuit means includes a second voltage-divider resistor network connected to said common line, to said output terminal of said polarity converting means, and to said base lead of said second transistor.

4. A power supply according to claim 3, in which said first and second biasing circuit means each further include first and second capacitance, means, respectively, for stabilizing voltage variations present thereat.

5. A power supply according to claim 4, in which said first voltage is of a positive polarity and in which said first transistor comprises an NPN transistor and said second transistor comprises PNP transistor.

6. A power supply according to claim 1, in which said switching means in said polarity converting means comprises a switching transistor having a collector-emitter path connected between said first terminal of said voltage source and one end of a coil, the other end of said coil being connected to said common line, a detector circuit connected between the connection of said coil and said collector-emitter path and said output terminal of said polarity converting means, level comparison means having a level comparing input connected to said first terminal of said voltage source and to said output terminal of said polarity converting means and a reference input connected to a reference potential for producing an output in response to a level comparison of said level comparing input and said reference input, and said pulse-width modulation signal generator is connected for receiving said output from said level comparison means and producing an output signal therefrom fed to a base lead of said switching transistor for controlling the switching operation thereof.

7. A power supply according to claim 6, in which said reference potential is derived from said common line.

8. A power supply according to claim 7, in which said detector includes a diode connected at one end to one end of a capacitor, the other end of said diode being connected to the connection of said coil and said collector-emitter path, the other end of said capacitor being connected to said common line, and said output terminal of said polarity converting means being connected to the connection of said diode and said capacitor.

9. A power supply according to claim 1, further comprising a choke coil having one end connected to said first terminal of said voltage source and the other end connected to said first voltage stabilizing means, and a capacitor connected between the other end of said choke coil and said common line.

10. A stabilized power supply comprising:
a DC voltage source having a first terminal at which a first DC voltage of first polarity is produced and a second terminal connected to a common ground;
polarity converting means having a first input connected to said first terminal of said voltage source and a second input connected to said common ground including a switching means controlled by an output of a pulse-width modulation means for producing at an output terminal a second DC voltage equal in absolute value to said first DC voltage and having an opposite polarity; and
voltage stabilizer means connected to said first terminal of said DC voltage source, to said output terminal of said polarity converting means, and to said common ground for producing between a first power-source, output terminal and said common ground and a second power-source, output terminal and said common ground stabilized DC voltages of equal absolute value and of opposite polarity, respectively, 11. A stabilized power supply according to claim 10, in which said voltage stabilizer means comprises first and second voltage stabilizing circuits, said first voltage stabilizing circuit being connected between said first terminal of said DC voltage source and said first power-source, output terminal and said second voltage stabilizing circuit being connected between said output terminal of said polarity converting means and said second power-source, output terminal.

12. A stabilized power supply according to claim 11, in which said first stabilizing circuit includes a first transistor of first junction polarity having a collector-emitter path connected between said first terminal of said voltage source and said first power-source, output terminal, a first Zener diode connected at one end to said common ground and at the other end to a base lead of said first transistor, and first biasing circuit means for supplying a current through said first Zener diode, and in which said second voltage stabilizing circuit includes a second transistor of junction polarity opposite said first transistor and having a collector-emitter path connected between said output terminal of said polarity converting means and said second power-source, output terminal, a second Zener diode connected at one end to said common ground and at the other end to a base lead of said second transistor, and second biasing circuit means for supplying a current through said second diode.

13. A stabilized power supply according to claim 12, in which said first biasing circuit means includes a voltage-divider resistive network connected to said common ground, to said first terminal of said voltage source, and to said base lead of said first transistor; and in which said second biasing circuit means includes a voltage-divider resistive network connected to said common ground, to said output terminal of said polarity converting circuit means, and to said base lead of said second transistor.

14. A stabilized power supply according to claim 13, in which said first and second biasing circuits further include first and second capacitance means, respectively.

15. A stabilized power supply according to claim 14, in which said first terminal of said voltage source is of positive polarity and in which said first transistor is an NPN junction transistor and said second transistor is a PNP junction transistor.

16. A stabilized power supply according to claim 10, in which said switching means of said polarity converting means comprises a switching transistor having one end of a collector-emitter path connected to said input terminal, and said polarity converting means further comprises a coil having one end connected to the other end of said emitter-collector path of said switching transistor and the other end connected to said common ground detecting circuit means connected between said one end of said coil and said output terminal, level comparing circuit means having a comparing input connected to both said first input and said output terminal and a reference input connected to a reference potential, and in which said pulse-width modulation means is connected between an output of said level comparing circuit means and a base lead of said switching transistor.

17. A stabilized power supply according to claim 16, in which said detecting circuit means comprises a diode connected at one end to a capacitor, the other end of said diode being connected to said other end of said collector-emitter path and the other end of said capacitor being connected to said common ground.

18. A stabilized power supply according to claim 10, further comprising a choke coil connected between said first terminal of said voltage source and said voltage stabilizer means and capacitor connected between the connection said choke coil and said voltage stabilizer means and said common ground.

* * * * *